United States Patent [19]

Geertman et al.

[11] Patent Number: 5,213,599
[45] Date of Patent: May 25, 1993

[54] METHOD OF MANUFACTURING TUBE GLASS

[75] Inventors: Robert E. M. Geertman; Gerrit Verspui; Johannes A. G. P. Damsteegt, all of Eindhoven, Netherlands

[73] Assignee: U.S. Philips Corp., New York, N.Y.

[21] Appl. No.: 838,386

[22] Filed: Feb. 19, 1992

[30] Foreign Application Priority Data

Feb. 26, 1991 [NL] Netherlands ............ 9100335

[51] Int. Cl.$^5$ ............................................. C03B 15/14
[52] U.S. Cl. .......................................... 65/30.1; 65/31;
65/60.1; 65/86; 65/126; 65/DIG. 4; 427/237
[58] Field of Search ............... 65/86, 30.1, 31, 30.13,
65/60.1, 60.8, 111, 126, DIG. 4; 427/237

[56] References Cited

U.S. PATENT DOCUMENTS

| | | | |
|---|---|---|---|
| 3,870,497 | 3/1975 | Spiessens | 65/86 |
| 4,175,941 | 11/1979 | Lagos et al. | 65/86 |
| 4,493,721 | 1/1985 | Auwerda et al. | 65/3.12 |
| 4,717,607 | 1/1988 | Pfizenmaier et al. | 65/86 |

FOREIGN PATENT DOCUMENTS 2027689  2/1980  United Kingdom .

OTHER PUBLICATIONS

Philips Tech. Review No. 44, pp. 241-249 May 1989 "Manufacturing Optical Fibres by the PCVD Process" Geittenr et al.

*Primary Examiner*—Joye L. Woodard
*Attorney, Agent, or Firm*—William L. Botjer

[57] ABSTRACT

In the manufacture of tube glass, in which following the drawing of a tube from molten glass the inside surface of the tube is treated with a chemically reactive gas or gas mixture, a gas or gas mixture which is not reactive at the drawing temperature of the glass is dispensed into the tube in the direction of drawing. At a location in the tube where the tube has cooled down so far that the diameter is constant, the gas or gas mixture is made to react by means of a plasma which is generated in the tube.

5 Claims, 1 Drawing Sheet

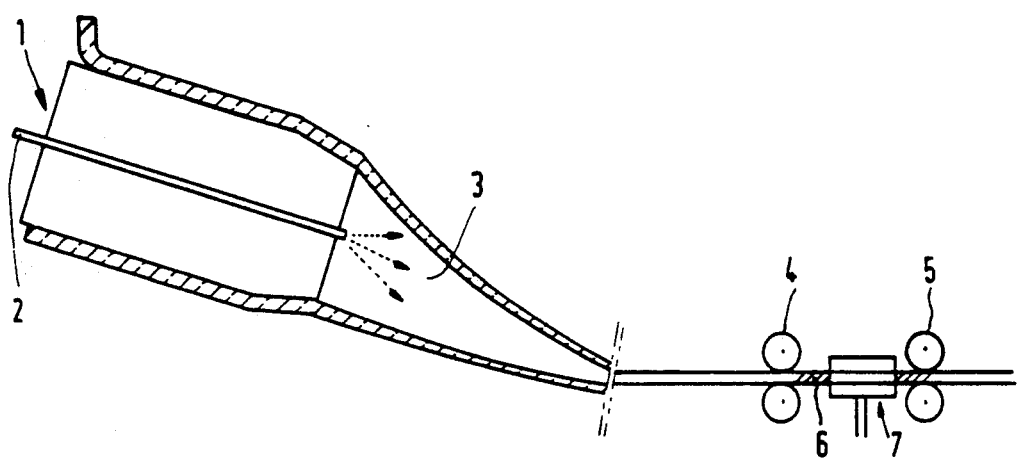

METHOD OF MANUFACTURING TUBE GLASS

BACKGROUND OF THE INVENTION

The invention relates to a method of manufacturing tube glass, in which following the drawing of a tube from molten glass the inside surface of the tube is treated with a chemically reactive gas or gas mixture.

Methods of this type are known per se.

Reference can be made to, for example, U.S. Pat. No. 4,717,607 in which a description is given of a method of extracting alkali and alkaline earth ions from the surface of tube glass during the drawing of tube glass from a glass melt. In said known method the reactive gas consists of a mixture of a gaseous organo-fluoride compound and an oxidizing gas. The reaction is brought about by the high temperature of the glass in the so-called bag of soft glass. The fluoride-containing gas formed reacts with the alkali and alkaline earth ions in the glass surface. The alkali and alkaline earth compounds formed are exhausted via the end of the tube formed from the glass. The tube glass obtained by this method can be suitably used for the manufacture of fluorescent lamps having a mercury-containing atmosphere.

A similar method is known from the published Netherlands Patent Application NL-A-79 06 006, which corresponds to British Application 2,027,689. In said method, for example, a volatile chloride of a metal and a gaseous oxidation means are dispensed into the bag of soft glass during drawing. Under the influence of the high temperature in the bag (800°-950° C.) a film of the oxide of the metal in question would be deposited on the inside wall of the bag. It is known, however, that a reaction between, for example, oxygen and the chlorides of, for example, silicon, titanium, tin only takes place in this temperature range when the reaction mixture contains a quantity of hydrogen or water vapour. In said Patent Application, layers of tin oxide, titanium oxide and indium oxide are mentioned as examples of layers which can be applied.

The known methods have the disadvantage that the surface layers formed in the bag of soft glass are deformed during the drawing of the tube to a smaller diameter. When the layers formed have a higher melting temperature or a higher softening temperature than the underlying glass, cracks may be formed in said layers as a result of the unavoidable deformation of said layers during the shaping of the bag into a tube. Due to this, the intended protection of the underlying glass or the intended optical function of the layer applied are not optimally obtained.

SUMMARY OF THE INVENTION

It is an object of the invention to provide a solution to the above problem. For this purpose, the method according to the invention is characterized in that a gas or gas mixture which is not chemically reactive or substantially not chemically reactive at the drawing temperature of the glass is introduced into the tube in the direction of drawing, which gas or gas mixture is made to react in the tube at the location where the tube has cooled down so far that the diameter is constant, by means of a plasma which is generated in the tube.

When the method according to the invention is used, the surface layers will no longer be subject to deformation after they have been formed in the plasma zone. In this manner, also very thin surface layers which are formed under the influence of the plasma provide a very effective protection of the underlying glass against attack by corrosive atmospheres or alkali and/or alkaline earth ions from the glass are prevented from adversely affecting the life cycle of the lamps manufactured from the tube glass obtained, for example fluorescent lamps. If, however, a minor thermal reaction takes place in the bag of soft glass, any cracks in the layer formed will be filled in the plasma zone, so that also under these conditions a properly sealing layer is obtained by the method according to the invention.

The method according to the invention can be used in all those cases in which it is desirable to apply a layer of a different composition on the inside of tube glass such as, for example, by extracting metal ions from the glass surface or by depositing layers having a protective and/or specific optical function on the glass surface. Layers having a specific optical function are, for example, layers which selectively reflect a portion of the spectrum, for example UV-reflecting layers which pass the visible portion of the spectrum.

In the method according to the invention, a reactive gas or a reactive gas mixture which consists of two or more components is used. In the manufacture of tubes from glass, the temperature of the soft glass in the bag being for example 800° C., a reactive gas is used which does not exhibit a noticeable thermal reaction up to temperatures of approximately 800° C. or higher, and which can be made to react under the influence of a plasma at temperatures at which the glass no longer deforms permanently and at which the diameter has become constant.

Examples of reactive gases are: etching gases such as $CF_4$, $C_2F_6$, $C_2F_4$, $NF_3$, $SF_6$ and $SO_2F_2$; said gases can also be used as mixtures with air or oxygen.

Reactive gas mixtures which are used for depositing layers having an optical or protective function are, for example, combinations of volatile or gaseous metal halogenides and oxidation means. Examples thereof are: $SiF_4$, $SiCl_4$, $AlCl_3$, $SnCl_4$, $TiCl_4$, $ZrCl_4$, $BF_3$, $BCl_3$, $PCl_3$, $YCl_3$, $CrO_2Cl_2$, $CH_4$, $HfCl_4$, $LaCl_3$, $Ni(CO)_4$, $TaF_5$ and the like; examples of oxidation means which can be used are $O_2$, $NO_2$ and $CO_2/H_2$ mixtures. By means thereof layers consisting of C, $SiO_2$, $Al_2O_3$, $SnO_2$, $TiO_2$, $ZrO_2$ etc. can be deposited. Of course, it is alternatively possible to deposit layers of mixed oxides by using mixtures of various metal halogenides. It is also possible to use gas mixtures which have an etching effect and from which a layer can be deposited, in general, gas mixtures comprising a metal fluoride have such an effect but other suitable mixtures are, for example, mixtures comprising a metal chloride and an etchant such as $C_2F_6$.

Correspondingly, layers of nitrides can be deposited, for example, by using a gas mixture consisting of $SiCl_4$ and $NH_3$. The only condition to be met is that the gas mixture is selected so that no or only a minor thermal reaction takes place in the bag of soft glass.

The plasma may be a high-frequency plasma and a microwave plasma. When an isothermal plasma having a high temperature is used, which will generally be the case in gas mixtures of atmospheric pressure and higher, the rate at which the glass tube is moved through the plasma zone has to be sufficiently high to preclude heating to the deformation temperature.

Preferably, the reaction is carried out using an isothermal plasma having a high temperature in a gas mixture of at least atmospheric pressure, the glass tube being moved through the plasma zone at a rate which is sufficiently high to preclude heating to the deformation temperature.

The use of a plasma has the advantage that, in general, higher reaction rates are possible than with thermal CVD processes. Under the influence of the plasma, in general, a more complete conversion of the gases can be obtained than would be possible with an exclusively thermal process. Thus, the method according to the invention provides a better controllable process which is less dependent on the drawing temperature and the drawing rate than a thermal CVD process, and in which no plasma is used.

BRIEF DESCRIPTION OF THE DRAWING

The FIGURE illustrates diagrammatically the method of drawing tube glass in accordance with the invention.

DETAILED DESCRIPTION OF THE PREFERRED EMBODIMENT

The method according to the invention will be explained in greater detail by means of the following exemplary embodiment and with reference to the accompanying drawing, in which the sole Figure diagrammatically shows a method of drawing tube glass according to the so-called Danner process (see, for example, U.S. Pat. No. 1,219,709) and the subsequent treatment of the inside surface. However, the tube glass can be manufactured just as well according to the so-called Vello-process (see, for example, U.S. pat. No. 2,009,793) or any other suitable process in which a bag of soft glass is formed into which the reactive gas can be blown.

In the Danner process, molten glass is drawn from a container, not shown, and provided around a rotating mandrel 1. Inside said mandrel there is a tube 2 for supplying a reactive gas, which tube opens into the bag 3 of soft glass. The temperature in said bag 3 generally ranges between 800° C. and 950° C. A device 7 for generating a plasma in the glass tube 6 is situated between the drawing rollers 4 and 5 where the tube glass 6 has cooled down so far that it can no longer be permanently deformed. The temperature of the glass at this location may be, for example, approximately 400° C. The device 7 may consist of, for example, a resonator, a travelling-wave applicator or a coil.

In a practical embodiment, a gas mixture containing $SiF_4$, oxygen and nitrogen in a proportion of 0.1:1:5 is blown into the bag of soft glass during the drawing of the tube. Such a mixture does not react or hardly reacts thermally at temperatures below approximately 1000° C. The velocity of the glass tube 6 in the plasma zone was approximately 5 meters per second. The gas mixture was blown into the tube at a flow rate of 2 $m^3$ per hour. By means of a resonant cavity 7 and an AC field of 2.45 Ghz a plasma was generated which has a high temperature at atmospheric pressure. The glass tube 6 is led through the plasma zone at such a rate that at the drawing force used the temperature of the glass tube, in situ, did not reach the deformation temperature. In this manner, a tube having an inside diameter of 65 mm which was coated on the inside with a thin layer of $SiO_2$ was obtained from a bag of soft glass. When said tube is used in fluorescent lamps, the layer effectively prevents sodium ions from diffusing out of the glass. As a result of the fluorine formed in the deposition reaction, a part of the sodium ions is etched from the surface of the glass.

We claim:

1. A method of manufacturing tube glass comprising the steps of:
   drawing the tube from molten glass;
   treating the inside surface of the tube glass with at least one gas, said gas being non-chemically reactive at the drawing temperature of the glass and chemically reactive at a higher temperature; and
   reacting the gas in the tube at a location where the tube has cooled down, such so that its diameter is constant, by applying a plasma which is generated in the tube.

2. The method as claimed in claim 1 wherein said at least one gas reacts with the glass surface under the influence of the plasma to extract metal ions.

3. The method as claimed in claim 1 wherein said at least one gas forms a layer on a glass surface under the influence of the plasma.

4. The method as claimed in claim 1 wherein said at least one gas comprises $SiF_4$, oxygen and nitrogen to deposit a layer of $SiO_2$ on the inner surface of said tube.

5. The method as claimed in claim 1 wherein the plasma is an isothermal plasma and said at least one gas is of at least atmospheric pressure, the glass tube being fed through the plasma at a rate which is sufficiently high to preclude heating to the deformation temperature of the tube.

* * * * *